United States Patent
König et al.

(10) Patent No.: US 9,452,745 B2
(45) Date of Patent: Sep. 27, 2016

(54) MASTER CYLINDER, IN PARTICULAR FOR A CONTROLLED BRAKE SYSTEM

(75) Inventors: Harald König, Ober-Mörlen (DE); Peter Drott, Frankfurt/Main (DE); Udo Jungmann, Mörfelden (DE); Andreas Bischoff, Frankfurt am Main (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 403 days.

(21) Appl. No.: 14/115,702

(22) PCT Filed: May 4, 2012

(86) PCT No.: PCT/EP2012/058280
§ 371 (c)(1),
(2), (4) Date: Jan. 24, 2014

(87) PCT Pub. No.: WO2012/150347
PCT Pub. Date: Nov. 8, 2012

(65) Prior Publication Data
US 2014/0150420 A1 Jun. 5, 2014

(30) Foreign Application Priority Data
May 5, 2011 (DE) .......... 10 2011 075 359

(51) Int. Cl.
*B60T 11/20* (2006.01)
*B60T 8/38* (2006.01)
*B60T 11/228* (2006.01)

(52) U.S. Cl.
CPC ............. *B60T 11/20* (2013.01); *B60T 8/38* (2013.01); *B60T 11/228* (2013.01)

(58) Field of Classification Search
CPC ...................................... B60T 11/228
USPC ............................................. 60/588
See application file for complete search history.

(56) References Cited

U.S. PATENT DOCUMENTS

| | | | |
|---|---|---|---|
| 6,418,717 B1 * | 7/2002 | Christiaens | B60T 11/16 60/588 |
| 6,584,771 B2 * | 7/2003 | Keller | B60T 11/16 60/588 |
| 6,951,104 B2 * | 10/2005 | Stobrawe | F15B 15/2892 60/589 |
| 6,973,784 B2 * | 12/2005 | Okuma | F16D 25/088 60/588 |
| 2009/0090105 A1 | 4/2009 | Taira | |
| 2013/0213033 A1 | 8/2013 | Konig et al. | |

FOREIGN PATENT DOCUMENTS

| | | |
|---|---|---|
| DE | 199 07 298 | 8/2000 |
| DE | 10 2004 057 137 | 8/2005 |
| DE | 10 2006 058 976 | 7/2007 |
| DE | 10 2009 054 695 | 6/2011 |
| EP | 1 162 119 | 12/2001 |
| EP | 1 889 767 | 2/2008 |

OTHER PUBLICATIONS

International Search Report corresponding to application No. PCT/EP2012/058280 dated Sep. 20, 2012.
German Search Report corresponding to application No. DE 10 2011 075 359.1 dated May 16, 2012.

* cited by examiner

*Primary Examiner* — Thomas E Lazo
(74) *Attorney, Agent, or Firm* — RatnerPrestia

(57) ABSTRACT

A master cylinder for a controlled brake system, including at least one piston which is displaceable in a housing and is sealed with respect to a pressure chamber by a sealing element arranged in an annular groove of the housing, which pressure chamber is connectable to an unpressurized supply chamber by control passages formed in the piston. The piston 46 is formed in at least two parts, including a main body and an annular control element, the control passages being provided in the control element.

12 Claims, 7 Drawing Sheets

(X)

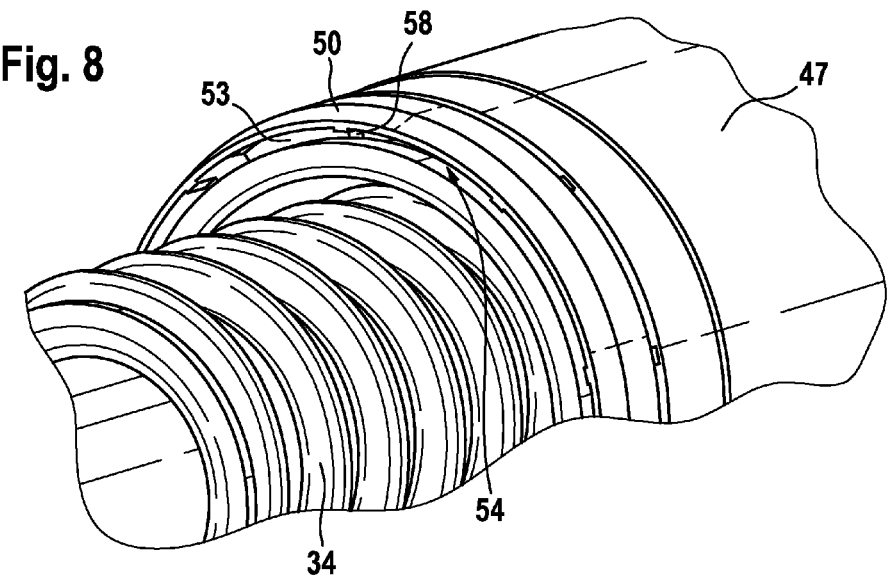
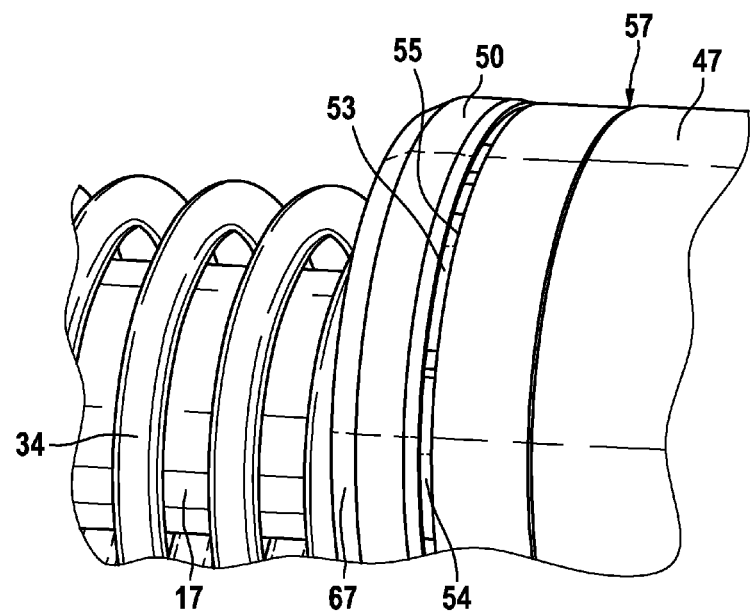

MASTER CYLINDER, IN PARTICULAR FOR A CONTROLLED BRAKE SYSTEM

CROSS REFERENCE TO RELATED APPLICATIONS

This application is the U.S. National Phase Application of PCT International Application No. PCT/EP2012/058280, filed May 4, 2012, which claims priority to German Patent Application No. 10 2011 075 359.1, filed May 5, 2011, the contents of such applications being incorporated by reference herein.

FIELD OF THE INVENTION

The invention relates to a master cylinder, in particular for a controlled brake system, comprising at least one piston which is displaceable in a housing and is sealed with respect to a pressure chamber by means of a sealing element arranged in an annular groove of the housing, which pressure chamber is connectable to an unpressurized supply chamber by means of control passages formed in the piston.

BACKGROUND OF THE INVENTION

A master cylinder for controlling a brake system is known, for example, from DE 10 2004 057 137 A1, which is incorporated by reference, the control passages being provided as radial transverse bores of small cross section and a circumferential internal groove being formed on an inner side in the region of the transverse bores in order to keep the dead travel of the master cylinder as short as possible and at the same time to lower the throttling resistance by reducing the length of the transverse bores.

With the use of a controlled brake system such as a brake system with traction control (ASR) or electronic stability program (ESP), in the event of a control intervention pressure medium is fed by a pump from a pressure medium reservoir via the master cylinder. A disadvantage here is that the small cross section of the transverse bores generates excessive flow resistance and the required pressure medium cannot be made available to the pump quickly enough.

In order to reduce the flow resistance, there is with the known master cylinders the possibility of providing a larger number of transverse bores or of optimizing the transverse bores with respect to their diameter. However, a disadvantage of the first-mentioned solution emerges in that the flow resistance is reduced to the benefit of the stability of the piston and, moreover, the provision of a large number of small transverse bores is uneconomic. The second solution has the disadvantage that the dead travel of the master cylinder is increased by displacement of the controlling side edge of the bores.

To avoid these disadvantages, DE 10 2009 054 695 A1, which incorporated by reference, proposes that the piston is made of plastics material and the control passages of the piston have a control edge formed parallel to an end face of the piston, the control passages being configured as axial grooves on an outer side of the piston. This makes it possible to increase the flow cross section of the control passages while the closing travel remains the same, so that dynamic behavior during control interventions can be improved. The axial grooves have the advantage that defined guidance of the sealing element on the outer side of the piston is ensured.

SUMMARY OF THE INVENTION

Therefore an aspect of the invention provides a different master cylinder which is improved with regard to the aforementioned disadvantages of the known master cylinder.

This is achieved according to an aspect of the invention with a piston formed in at least two parts, comprising a main body and an annular control element in which the control passages are provided. The control element, which is not subjected to pressure loading, can therefore have a very thin-walled, filigree configuration without influencing the stability of the main body. In other words, the pressure region and the supply region of the piston are separated from one another.

According to an advantageous embodiment of the invention, the annular control element is arranged in an external groove of the main body. Said groove can be worked into the main body in a simple manner during manufacture, substantially simplifying production of the main body. The control passages preferably have a control edge formed parallel to an end face of the piston, which control edge is formed on the main body. It is thereby made possible to increase the flow cross section of the control passages while the closing travel remains the same, so that dynamic behavior during control interventions can be improved.

In this case is it is especially advantageous if the control edge is formed by a side wall of the external groove and an outer side of the main body. According to an advantageous development of the invention, the control passages are provided as axial grooves on an outer side of the control element. The axial grooves have the advantage that defined guidance of the sealing element on the outside of the piston is ensured. An alternative advantageous embodiment of the invention provides that the control element is configured as a corrugated ring.

Another alternative advantageous embodiment of the invention provides that the control passages are provided as gaps between ribs on an inner side of the control element, the ribs projecting axially beyond the control element on the side of the control element oriented towards the control edge. The main body is preferably provided as a turned or extruded part. A piston optimized with respect to weight can be achieved if the main body is made of aluminum.

Assembly can be carried out in a simple manner if, according to an advantageous embodiment of the invention, the control element is provided as a reversibly deformable preform which can be expansion-fitted to the main body. The control element is preferably made of plastics material, whereby low-cost manufacture can be achieved.

According to an alternative embodiment of the invention, the control element may be formed from resilient sheet metal.

An especially advantageous embodiment of the invention provides that the external groove is provided in the region of a reduced diameter of the main body. Both lower flow resistance for dynamic stability control systems and improved supply flow in the event of volume shortfall can be cited as advantages of the now initially larger gap between the piston and the housing.

BRIEF DESCRIPTION OF THE DRAWINGS

The invention is best understood from the following detailed description when read in connection with the accompanying drawings. Included in the drawings is the following figures:

FIG. 8 shows a detail of a piston of a third exemplary embodiment of a master cylinder according to the invention in a three-dimensional representation;

FIG. 9 shows a further detail of the piston according to FIG. 8;

DETAILED DESCRIPTION OF THE DRAWINGS

Figure 1:
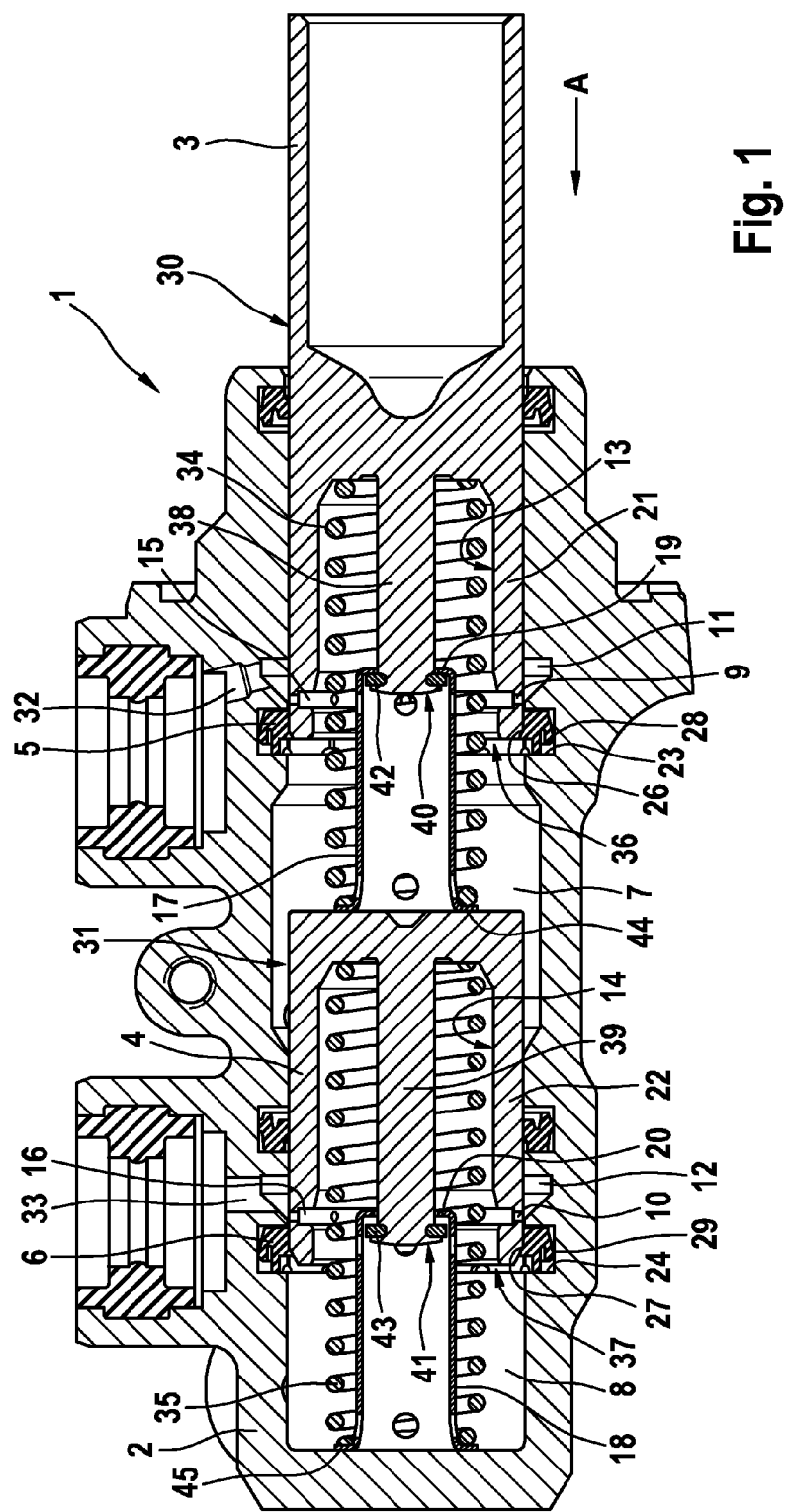
FIG. 1 shows a known master cylinder in longitudinal section.
Figure 2:
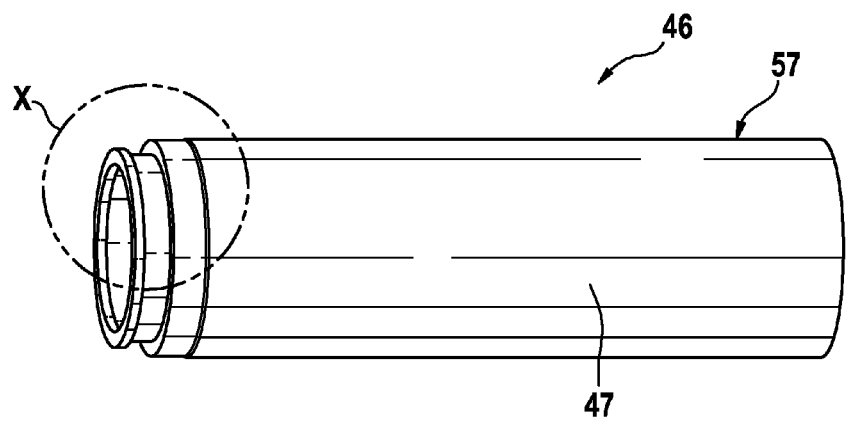
FIG. 2 shows a piston of a first exemplary embodiment of a master cylinder according to the invention in a three-dimensional representation.

FIG. 1 shows in longitudinal section a known master cylinder 1 which finds application, for example, in a controlled brake system with traction control (ASR) and/or electronic stability program (ESP) and which is of plunger-type tandem design.

The master cylinder 1 comprises a first and second piston 3, 4 which are displaceable in a housing 2, a circular sealing element 5, 6 with a dynamically loaded inner sealing lip 26, 27 and a statically loaded outer sealing lip 28, 29 being provided in an annular groove 23, 24 of the housing 2. The dynamically loaded inner sealing lip 26, 27 bears with a first sealing face against the piston 3, 4 and the statically loaded outer sealing lip 28, 29 bears with a second sealing face against a base of the annular groove 23, 24. An outer side 30, 31 of the piston 3, 4 serves as a guide surface.

A first and a second pressure chamber 7, 8 are connected, in an unactuated state of the master cylinder 1 represented in FIG. 1, via a pressure medium channel 32, 33 and a supply chamber 11, 12 in the housing 2, and via control passages 9, 10 in the form of transverse bores in a pot-shaped wall 21, 22 provided on a side 36, 37 of the first and second pistons 3, 4, to an unpressurized pressure medium reservoir (not shown). Depending on its configuration, the master cylinder 1 has from four to twenty-four transverse bores 9, 10 on the circumference of the piston 3, 4. The pistons 3, 4 are preloaded by means of compression springs 34, 35.

The compression spring 34, 35 is arranged at least partially inside the pot-shaped wall 21, 22. A central stud 38, 39 which ends before it exits the wall 21, 22 axially, projects centrally through the wall 21, 22. This end 40, 41 is provided with a stop 42, 43 for a sleeve 17, 18, which stop 42, 43 cooperates with a collar 19, 20 in such a way that the sleeve 17, 18 can be telescoped to a limited extent relative to the stud 38, 39. In other words, the sleeve 17, 18 is urged with the compression spring 34, 35 into the interior of the piston upon actuation. As will be seen, the stop 42, 43 is preferably a washer which is riveted—in particular wobble-riveted—to the stud 38, 39. The opposite end of the sleeve 17, 18 has a plate-like collar 44, 45 for abutment of the compression spring 34, 35.

In order to actuate the master cylinder 1, the first piston 3 is displaced in the actuation direction A. As this happens the movement of the first piston 3 is transmitted via the compression spring 34 to the second piston 4. As soon as the transverse bores 9, 10 are in the region of the sealing elements 5, 6, that is, the controlling side edge of the bores has been passed, the so-called dead travel of the master cylinder 1 is completed, since pressure medium can no longer reach the pressure chambers 7, 8 from the supply chambers 11, 12 through the transverse bores 9, 10. The connection of the pressure chambers 7, 8 to the pressure medium reservoir is interrupted and pressure is built up in the pressure chambers 7, 8.

The two pistons 3, 4 arranged one behind the other of the master cylinder 1 are practically identical in structure and operation, so that only the first piston 3 is described further.

During an ASR or ESP intervention it may be necessary, with the piston 3 unactuated or actuated, to feed pressure medium from the pressure medium reservoir via the pressure chamber 7 in the direction of the wheel brakes, which is preferably effected by means of a pump, the intake of which is connectable selectively to the pressure chambers 7, 8 of the master cylinder 1 or to the wheel brakes, in order to pump in the direction of the wheel brakes or in the direction of the master cylinder 1 (return principle). For this purpose, during an ASR or ESP intervention in an unactuated state of the master cylinder 1, the pressure medium is fed from the pressure medium reservoir via the pressure medium channel 32, the supply chamber 11, the transverse bores 9 and the pressure chamber 7. During an ESP intervention in the actuated state of the master cylinder 1, pressure medium is additionally fed by flowing across the outer sealing lip 28 of the sealing element 5, which lip is folded over by the suction pressure in the direction of the inner sealing lip 26, so that the sealing face of the outer sealing lip 28 no longer rests against the base of the annular groove 23. In order to make sufficient pressure medium available quickly to the pump during an ASR or ESP intervention, especially in the unactuated position of the master cylinder 1, it is necessary to keep the flow resistance of the transverse bores 9 as low as possible, although the dead travel of the master cylinder 1 must also be kept as short as possible.

In the region of the transverse bores 9, 10 a respective radial, circumferential internal groove 15, 16 is provided on an inner side 13, 14 of the piston 3, 4, shortening the length of the transverse bores 9, 10. The throttling resistance is intended to be reduced thereby. This proves to be disadvantageous, however, firstly because of the technical complexity and cost of producing the internal groove 15, 16 and, secondly, because the flow resistance of the transverse bores 9, 10 depends directly on the bore diameter, so that the internal groove 15, 16 does not make possible any reduction in flow resistance. Moreover, the stability of the piston 3, 4 can be negatively influenced if a large number of transverse bores 9, 10 is provided.

Exemplary embodiments of a master cylinder according to the invention which does not differ fundamentally in operation and structure from the known master cylinder according to FIG. 1 are apparent from FIGS. 2 to 11. Only the pistons have been modified with respect to the known master cylinder according to FIG. 1, so that a repeated description of their operation and structure can be dispensed with and only a piston 46 of the master cylinder according to the invention, corresponding to the piston 3 described hereinbefore, will be described. Like components are designated by the same reference symbols.

In order to improve the known master cylinder with regard to stability, flow cross section and production costs, the pistons 46 of the exemplary embodiment described below are formed in at least two parts, comprising a main body 47 and an annular control element 48, 49, 50, and the control passages 51, 52, 53 are provided in the control element 48, 49, 50. This yields the advantage, in all the exemplary embodiments, that the control element 48, 49, 50, which is not subjected to pressure loading, can have a very thin-walled, filigree configuration without influencing the stability of the main body 47. As a result of the configuration of the piston 46 according to the invention, therefore, the pressure region and the supply region of the piston 46 are separated from one another.

The main body 47, which is provided, for example, as a turned or extruded part made of aluminum in order to obtain an optimized piston 46 with respect to weight, is provided in all the exemplary embodiments with an external groove 54 in which the annular control element 48, 49, 50 is arranged. The external groove 54 may be worked into the main body 47 in a simple manner during manufacture, substantially simplifying the production of the main body.

In order to simplify assembly, the control element 48, 49, 50 is in all the embodiments a reversibly deformable preform which is expansion-fitted to the main body 47.

Figure 4:
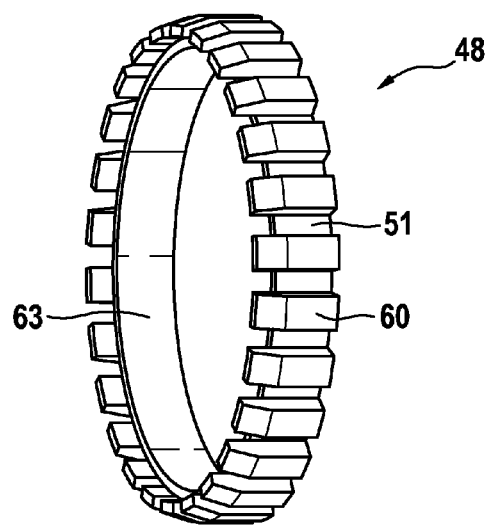
FIG. 4 shows a control element of the master cylinder according to the invention as shown in FIGS. 2 and 3 in a three-dimensional representation.
Figure 10:
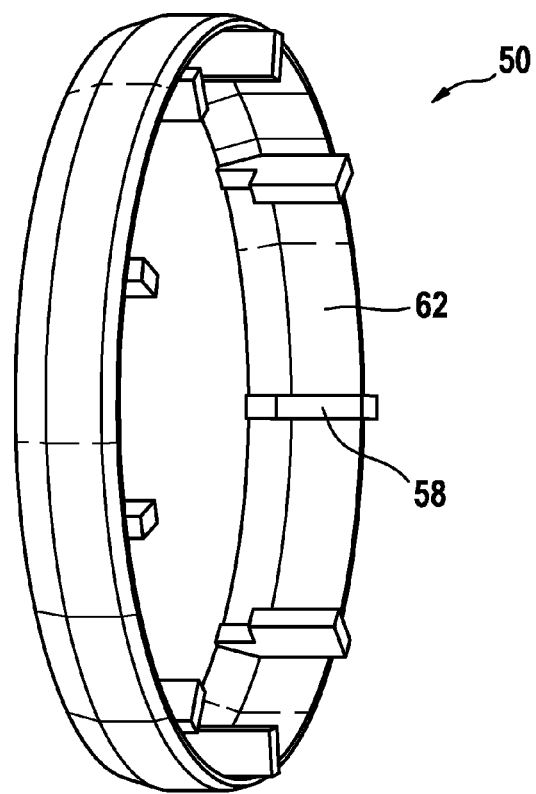
FIG. 10 shows a control element of the master cylinder according to the invention as shown in FIGS. 8 and 9 in a three-dimensional representation.

The control element 48, 50 of the first and third exemplary embodiments represented three-dimensionally in FIGS. 4 and 10 is made of plastics material, whereby low-cost manufacture can be achieved.

Figure 6:
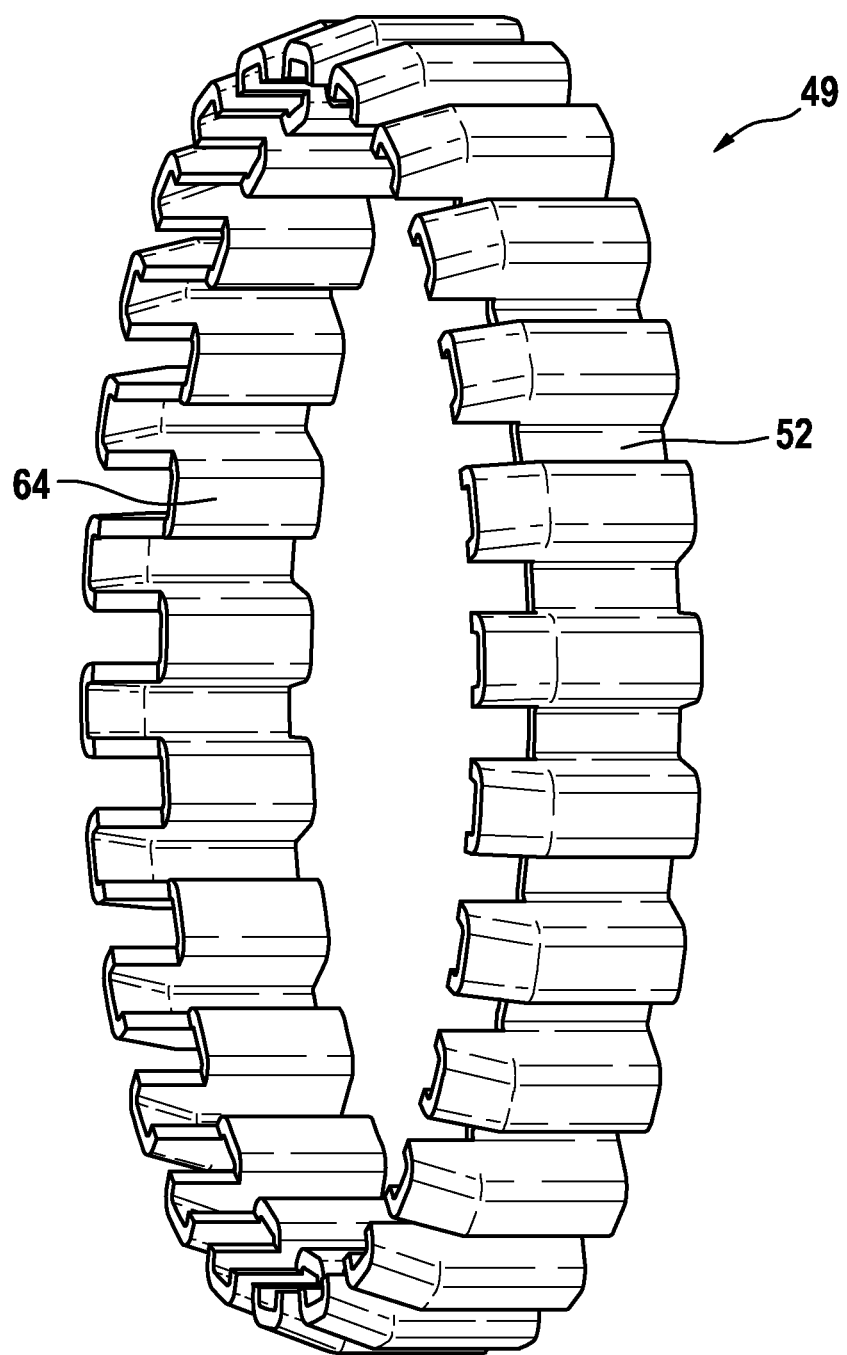
FIG. 6 shows a control element of a second exemplary embodiment of a master cylinder according to the invention in a three-dimensional representation.

Alternatively, the control element 49 of the second exemplary embodiment shown in FIG. 6 is in the form of a corrugated ring made of resilient sheet metal.

Figure 3:
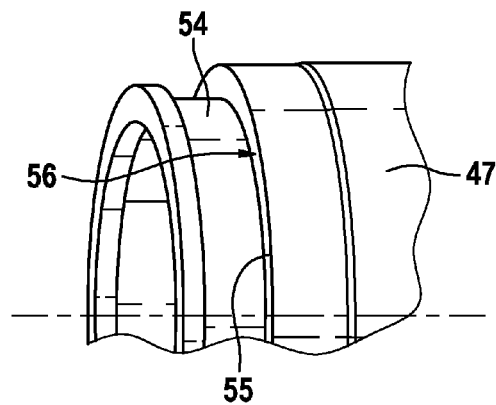
FIG. 3 shows an enlarged detail X of the piston according to FIG. 2.

In order to enlarge the flow cross section of the control passages 51, 52, 53 while the closing travel remains unchanged, so that dynamic behavior can be improved during control interventions, the control passages 51, 52, 53 have a control edge 55 formed parallel to an end face of the piston, the control edge 55 being formed on the main body 47 by a side wall 56 of the external groove 54 and an outer side 57 of the main body 47, as is apparent, for example, from FIG. 3.

Figure 5:
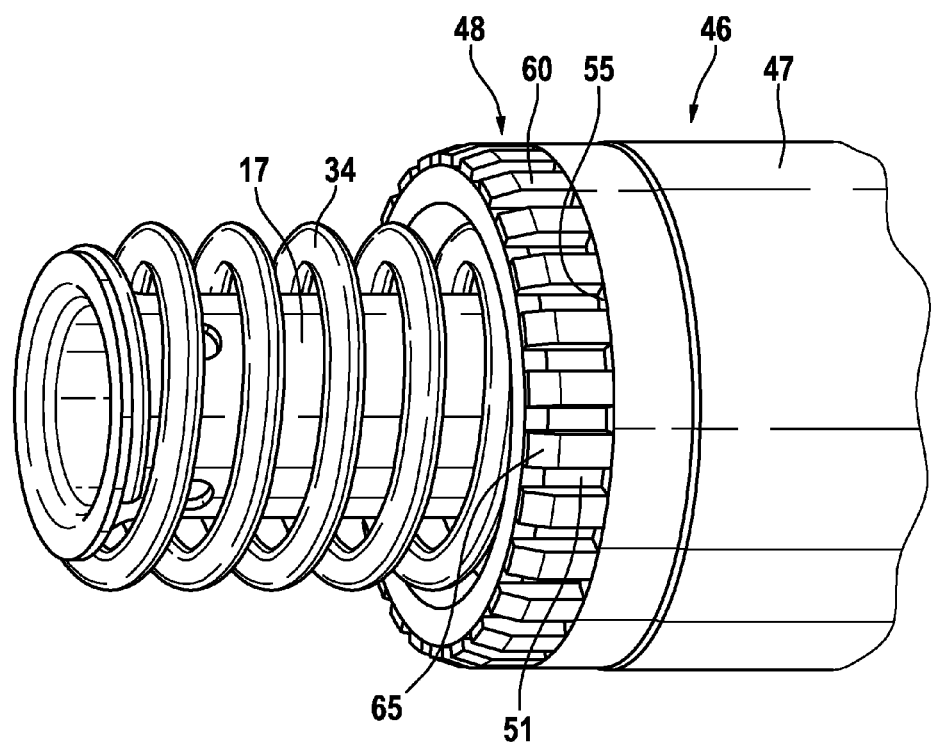
FIG. 5 shows a detail of the piston according to FIG. 2 with fitted control element in a three-dimensional representation.
Figure 7:
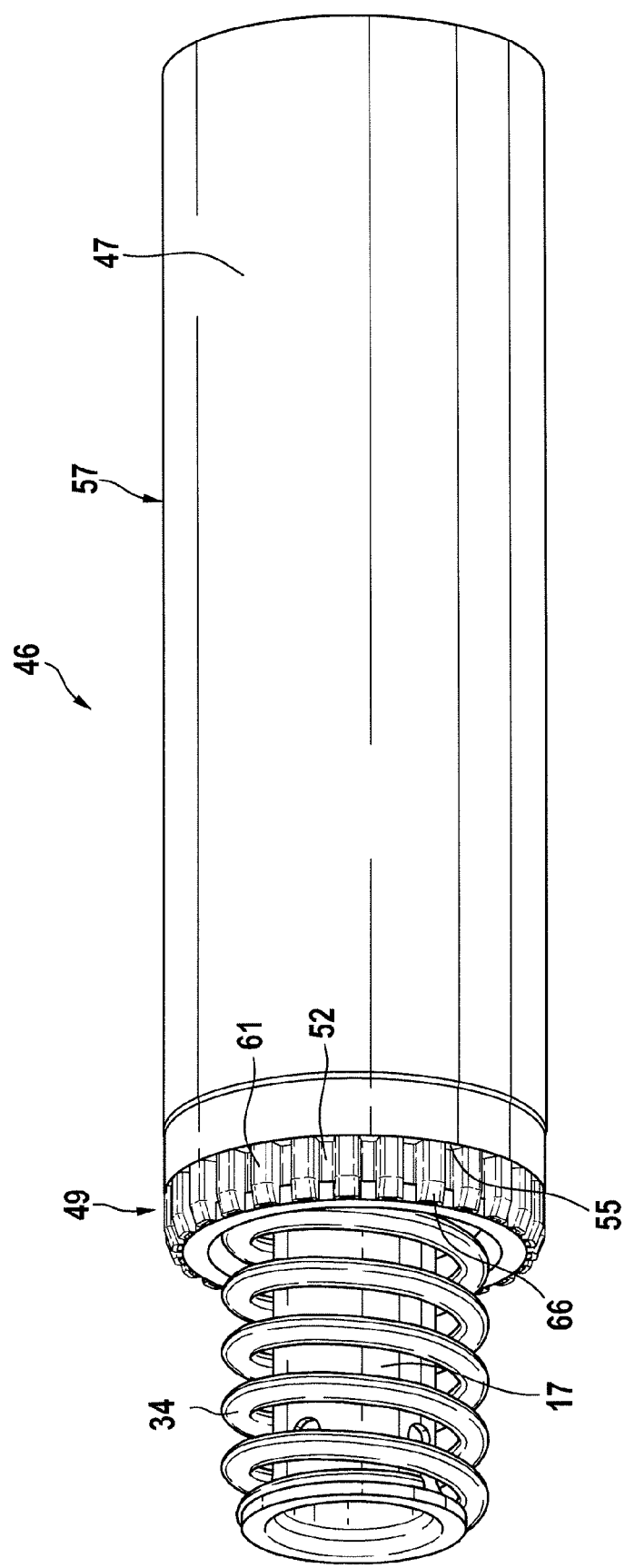
FIG. 7 shows a piston with fitted control element according to FIG. 6 in a three-dimensional representation.

The first two exemplary embodiments according to FIGS. 5 and 7 show as control passages 51, 52 as axial grooves on an outer side of the control element 48, 49. The axial grooves have the advantage that defined guidance of the sealing element 5 on the outside 57 of the piston 46 is ensured.

Here, the first exemplary embodiment provides that the control passages 51 are in the form of gaps between ribs 60 which are arranged on an annular body 63. The control element 48 engages in the external groove 54 with its annular body 63, as is clearly apparent from FIG. 5.

According to the second exemplary embodiment, in which the control element 49 is provided as a corrugated ring, gaps between outwardly directed ribs 61 form the control passages 52 and inwardly directed ribs 64 engage in the external groove 54 as fastening means.

Figure 11:
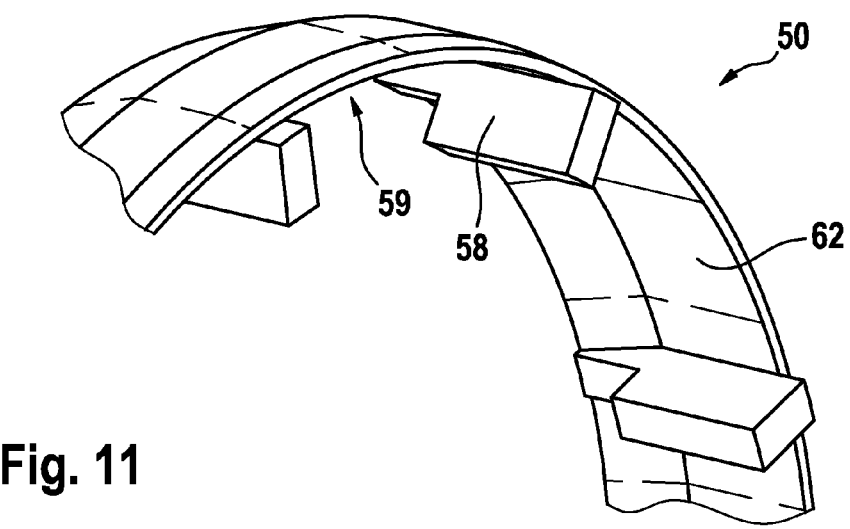
FIG. 11 shows a detail of the control element according to FIG. 10 in a three-dimensional representation.

By contrast, the third exemplary embodiment according to FIGS. 8 and 9 provides, alternatively, that the control passages 53 are provided as gaps between ribs 58 which engage in the external groove 54. FIGS. 10 and 11 show the control element 50 of the third exemplary embodiment in a three-dimensional representation, an enlarged detail being shown in FIG. 11. It can be clearly seen from these figures that the ribs 58 are provided on an inner side 59 of the control element 50 and that the ribs 58 on the side of the control element 50 oriented towards the control edge 55 project axially beyond the control element 50. Abutment of the control element 50 against the side wall 56 of the external groove 54 can thereby be prevented. At the same time, the projection of the ribs 58 and the gaps between the ribs 58 make possible a flow cross section as large as possible without restricting the stability of the main body 47.

If the external groove 54 is provided in the region of a reduced diameter of the main body 47, as can be seen, for example, in FIGS. 3, 7 and 8, this yields, as advantages of the now initially larger gap between the piston 46 and the housing 2, both a lower flow resistance for stability control systems, and an improved supply of pressure medium in the event of volume shortfall.

It should further be noted that in the installed state the control element 48, 49, 50 ends with the end face of the piston, so that abutment of the inner sealing lip 26 against the outside 57 of the piston 46 can be ensured. For this purpose, either the ribs 60, 61 forming the control passages 51, 52 on the outside of the control element 48, 49, or an annular body 62 on the inner side of which the ribs 58 are arranged, may extend up to the end face of the piston of the main body 47, the control element 48, 49, 50 having at the end face of the piston a chamfer 65, 66, 67 which facilitates installation of the piston 46.

LIST OF REFERENCES

1 Master cylinder
2 Housing
3 Piston
4 Piston
5 Sealing element
6 Sealing element
7 Pressure chamber
8 Pressure chamber
9 Control passage
10 Control passage
11 Supply chamber
12 Supply chamber
13 Inner side
14 Inner side
15 Internal groove
16 Internal groove
17 Sleeve
18 Sleeve
19 Collar
20 Collar
21 Wall
22 Wall
23 Annular groove
24 Annular groove
26 Inner sealing lip
27 Inner sealing lip
28 Outer sealing lip
29 Outer sealing lip
30 Outer side
31 Outer side
32 Pressure medium channel
33 Pressure medium channel
34 Compression spring
35 Compression spring
36 Side
37 Side
38 Stud
39 Stud
40 End
41 End
42 Stop 43 Stop
44 Collar
45 Collar
46 Piston
47 Main body
48 Control element
49 Control element
50 Control element
51 Control passage
52 Control passage
53 Control passage
54 External groove
55 Control edge
56 Side wall
57 Outer side
58 Rib
59 Inner side
60 Rib
61 Rib
62 Annular body
63 Annular body
64 Rib
65 Chamfer
66 Chamfer
67 Chamfer
A Actuation direction

The invention claimed is:

1. A master cylinder for a controlled brake system, comprising at least one piston which is displaceable in a housing and is sealed with respect to a pressure chamber by means of a sealing element arranged in an annular groove of the housing, which pressure chamber is connectable to an unpressurized supply chamber by control passages formed in the piston, wherein the piston is formed in at least two parts, comprising a main body and an annular control element, the control passages being provided in the control element, wherein the control element is in the form of a corrugated ring.

2. The master cylinder as claimed in claim 1, wherein the annular control element is arranged in an external groove of the main body.

3. The master cylinder as claimed in claim 1, wherein the control passages have a control edge formed parallel to an end face of the piston, which control edge is formed on the main body.

4. The master cylinder as claimed in claim 3, wherein the control edge is formed by a side wall of the external groove and an outer side of the main body.

5. The master cylinder as claimed in claim 1, wherein the control passages are provided as axial grooves on an outer side of the control element.

6. A master cylinder for a controlled brake system, comprising at least one piston which is displaceable in a housing and is sealed with respect to a pressure chamber by means of a sealing element arranged in an annular groove of the housing, which pressure chamber is connectable to an unpressurized supply chamber by control passages formed in the piston, wherein the piston is formed in at least two parts, comprising a main body and an annular control element, the control passages being provided in the control element, wherein the control passages have a control edge formed parallel to an end face of the piston, which control edge is formed on the main body, and wherein the control passages are provided as gaps between ribs on an inner side of the control element, the ribs projecting axially beyond the control element on the side of the control element oriented towards the control edge such that an annular gap is formed between the control element and the main body radially outward of the control passages.

7. The master cylinder as claimed in claim 1, wherein the main body is provided as a turned or extruded part.

8. The master cylinder as claimed in claim 1, wherein the main body is made of aluminum.

9. The master cylinder as claimed in claim 1, characterized in that the control element is provided as a reversibly deformable preform which can be expansion-fitted to the main body.

10. The master cylinder as claimed in claim 1, wherein the control element is made of a plastic material.

11. A master cylinder for a controlled brake system, comprising at least one piston which is displaceable in a housing and is sealed with respect to a pressure chamber by means of a sealing element arranged in an annular groove of the housing, which pressure chamber is connectable to an unpressurized supply chamber by control passages formed in the piston, wherein the piston is formed in at least two parts, comprising a main body and an annular control element, the control passages being provided in the control element, wherein the control element is made of resilient sheet metal.

12. The master cylinder as claimed in claim 2, wherein the external groove is provided in the region of a reduced diameter of the main body.

* * * * *